United States Patent [19]
Park et al.

[11] Patent Number: 5,272,574
[45] Date of Patent: Dec. 21, 1993

[54] RECORDING/PLAYBACK CIRCUIT IN A VIDEO TAPE RECORDER CAPABLE OF RECORDING A PLURALITY OF VIDEO SIGNALS

[75] Inventors: Pan-Gi Park; Hyeong-Gu Byeon, both of Seoul, Rep. of Korea

[73] Assignee: SamSung Electronics Co. Ltd., Suwon, Rep. of Korea

[21] Appl. No.: 753,095

[22] Filed: Aug. 30, 1991

[30] Foreign Application Priority Data

Sep. 19, 1990 [KR] Rep. of Korea .................. 1990-14824

[51] Int. Cl.$^5$ .............................................. H04N 5/78
[52] U.S. Cl. ...................................... 360/33.1; 360/61; 358/153
[58] Field of Search ...................... 360/55, 63, 64, 33.1, 360/61, 32, 35.1; 358/153, 148, 335

[56] References Cited

U.S. PATENT DOCUMENTS

| | | | |
|---|---|---|---|
| 3,614,309 | 10/1971 | Presti | 360/35.1 |
| 3,686,436 | 8/1972 | Camras | 360/18 X |
| 3,862,355 | 1/1975 | Guisinger | 360/14.2 X |
| 3,898,377 | 8/1975 | Fairbairn et al. | 358/153 X |
| 4,393,162 | 7/1983 | Yamamoto | 360/38.1 X |
| 4,783,704 | 11/1988 | Funston | 360/11.1 |
| 4,862,269 | 8/1989 | Sonoda et al. | 358/148 X |
| 4,970,588 | 11/1990 | Kobayashi | 358/153 X |
| 4,994,916 | 2/1991 | Pshtissky et al. | 360/18 X |
| 5,099,365 | 3/1992 | Kang | 360/61 |
| 5,124,853 | 6/1992 | Kashida et al. | 360/64 X |

Primary Examiner—Andrew L. Sniezek
Attorney, Agent, or Firm—Robert E. Bushnell

[57] ABSTRACT

A circuit for concurrently recording at least two picture signals, each received from at least two different desired television broadcasting channels, on a single video tape in a video tape recorder, and for concurrently reproducing at least two picture signals from a single video tape on which at least two different television broadcasting channels are recorded, in a video tape recorder provided with such video tape. First and second vertical synchronization detection circuits 104, 105 detect each vertical synchronization signal from first and second video signal input terminals VD1, VD2. A recording controller 106 receives the vertical synchronization signals that are detected by the first vertical synchronization detection circuit 104 and the second vertical synchronization signal detection circuit 105, and therefrom produces a first memory control signal, a first mixing control signal and a first selection control signal. Memory 102 receives the digital signals converted by the first A/D convention circuit 101 and stores the received digital signals under control of the first memory control signal. A first mixing circuit 107 thereby produces a mixed signal in a half frame unit. A first selection circuit 108 selects either the output of the first mixing circuit 107 or the input signals of the first and second video signal input terminals VD1, VD2 according to the first selection control signal of the recording controller 106.

11 Claims, 4 Drawing Sheets

100
RECORDING/PLAYBACK CIRCUIT IN A VIDEO TAPE RECORDER CAPABLE OF RECORDING A PLURALITY OF VIDEO SIGNALS

BACKGROUND OF THE INVENTION

The present invention relates to a recording and reproducing (playback) circuit in a video tape recorder (VTR) and particularly to a video signal double recording and reproducing circuit which can record and reproduce the two different picture signals on one video tape simultaneously.

With society being diversified and television broadcasting stations growing in number, the number of television channels have increased, and therefore, television viewers periodically wish to watch a multiplicity of programs being broadcasted on two or more channels at the same time. Nevertheless, with a single VTR can record only those picture signals from one a single channel.

SUMMARY OF THE INVENTION

An object of the present invention is to provide a circuit which can simultaneously record picture signals received from two different selected television broadcasting channels on a single video tape.

Another object of the present invention is to provide a circuit which can selectively reproduce those picture signals on two different channels at the same time from the single video tape.

According to one aspect of the present invention, a preferred embodiment of the invention includes a circuit for concurrently recording two or more picture signals, each received from two or more different television broadcasting channels, on a single video tape in a video tape recorder comprising:

a first and a second video signal input terminals;

a first vertical synchronization detector connected to detect a vertical synchronization signal from a video input of the first video signal input terminal;

a second vertical synchronization detector connected to detect a vertical synchronization signal from a video input of the second video signal input terminal;

analog/digital (A/D) converter for converting the video input of the second video signal input terminal into a digital signal;

a recording controller connected to receive the vertical synchronization signals detected by the first and second vertical synchronization detector for producing a first memory control signal, a first mixing control signal and a first selection control signal;

a memory connected to receive the digital signal converted by said A/D converter, for storing therein the received digital signal under control of the first memory control signal;

digital/analog (D/A) converter connected to receive the digital signal read out of the memory means for converting the digital signal into a corresponding analog signal;

mixer connected to receive the analog signal from the D/A converter and the video input from said first video signal input terminal for providing selection between the received analog signal and the video input to an output under control of the first mixing control signal, thereby mixing the two signals in a half frame unit; and selector connected to selectively receive either the output of the mixing means or the one video input of the first and second video signal input terminals according to the first selection control signal of the recording controller.

According to another aspect of the invention, a preferred embodiment of the invention includes a circuit for concurrently reproducing two or more picture signals from a single video tape on which two or more different television broadcasting channels are recorded. In a video tape recorder provided with such video tape, the circuit for concurrently reproducing is operably connectable to the circuit for concurrently recording and comprises:

reproduction controller providing all the controls upon execution of reproduction of the recorded picture signals as well as providing a second memory control signal, a second mixing control signal, a second selection control and a third selection control signal;

a second mixer for mixing together the video signals received from a plurality of reproducing heads to therefrom produce a complete one-frame video signal;

a second selector connected to receive the video signals of two channels from the reproducing heads to therefrom provide an output in dependence upon the second selection control signal generated in the reproduction controller;

analog/digital converter connected to receive the output from the second selector for converting the output into a corresponding digital signal;

memory connected to receive the second memory control signal generated in the reproduction controller 213 and, under the control of the control signal, for storing the output of the analog/digital converter;

digital/analog converter for converting the output of the memory into a corresponding analog signal again;

a third mixer for selectively providing either the output of the D/A converter or the output of the second selector according to the second mixing control signal; and a third selection means for selectively providing either one of the output of said second mixing means and the output of said third mixing means according to said third selection control signal.

DETAILED DESCRIPTION OF THE INVENTION

A more complete appreciation of the invention, and many of the attendant advantages thereof, will be readily enjoyed as the same becomes better understood by reference to the following detailed description when considered in conjunction with the accompanying drawings in which like members indicate the same or similar components.

Figure 1:
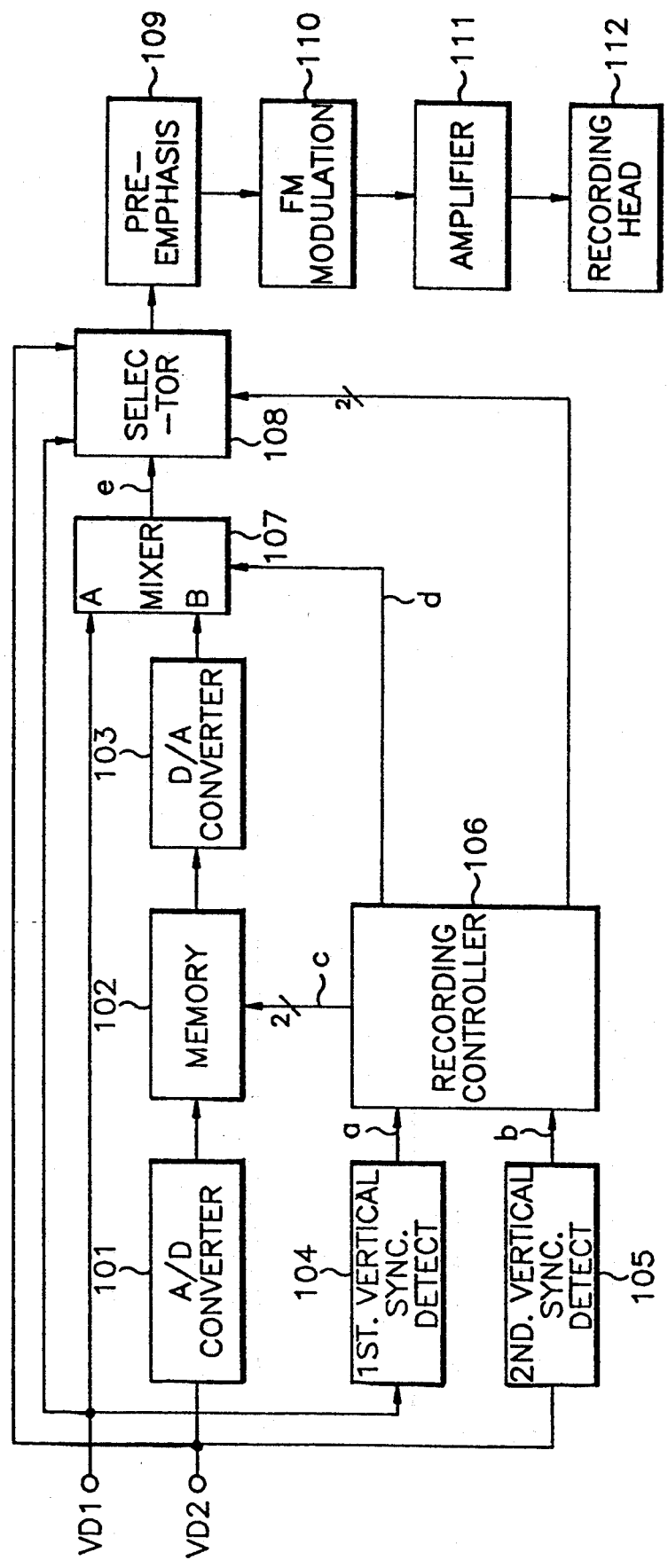
FIG. 1 is a schematic block diagram of a video signal recording circuit according to the present invention.

Referring to FIG. 1, there is shown a preferred embodiment of a video signal recording circuit according to the present invention, in which a first video signal input terminal VD1 and a second video signal input terminal VD2 are respectively shown. A first vertical synchronization detection circuit 104 detects a vertical synchronization signal from the input signal of the first video signal input terminal VD1. A second vertical synchronization detection circuit 105 detects a vertical synchronization signal from the input signal of the second video signal input terminal VD2. A first analog/-digital (A/D) conversion circuit 101 converts the input signals of the second video signal input terminal VD2 into digital signals. A recording controller 106 receives the vertical synchronization signals that are detected by the first vertical synchronization detection circuit 104 and the second vertical synchronization signal detection circuit 105, and therefrom produces a first memory control signal, a first mixing control signal and a first selection control signal. A first memory 102 receives the digital signals converted by said first A/D convention circuit 101 and stores the received digital signals under control of the first memory control signal. A first D/A conversion circuit 103 receives the signals read out of the first memory 102 and converts them into an analog signal. A first mixing circuit 107 selectively provides either the analog signal converted by the first D/A conversion circuit 103 or the input signal of the first video signal input terminal VD1 under control of the first mixing control signal, to thereby produce a mixed signal in a half frame unit. A first selection circuit 108 selects either the output of the first mixing circuit 107 or the input signals of the first or second video signal input terminals VD1, VD2 according to the first selection control signal of the recording controller 106. A pre-emphasis circuit 109 receives the signals selected by the first selection circuit 108 to provide therefrom an output augmented in a high-band portion. An frequency-modulation (FM) circuit 110 modulates in frequency the output of the pre-emphasis circuit 109. An amplifier 111 amplifies the signal modulated by the said FM circuit 110. A recording head 112 receives the output from the amplifier 110 to therefrom produce a magnetic field to be recorded on the video tape.

Figure 2:
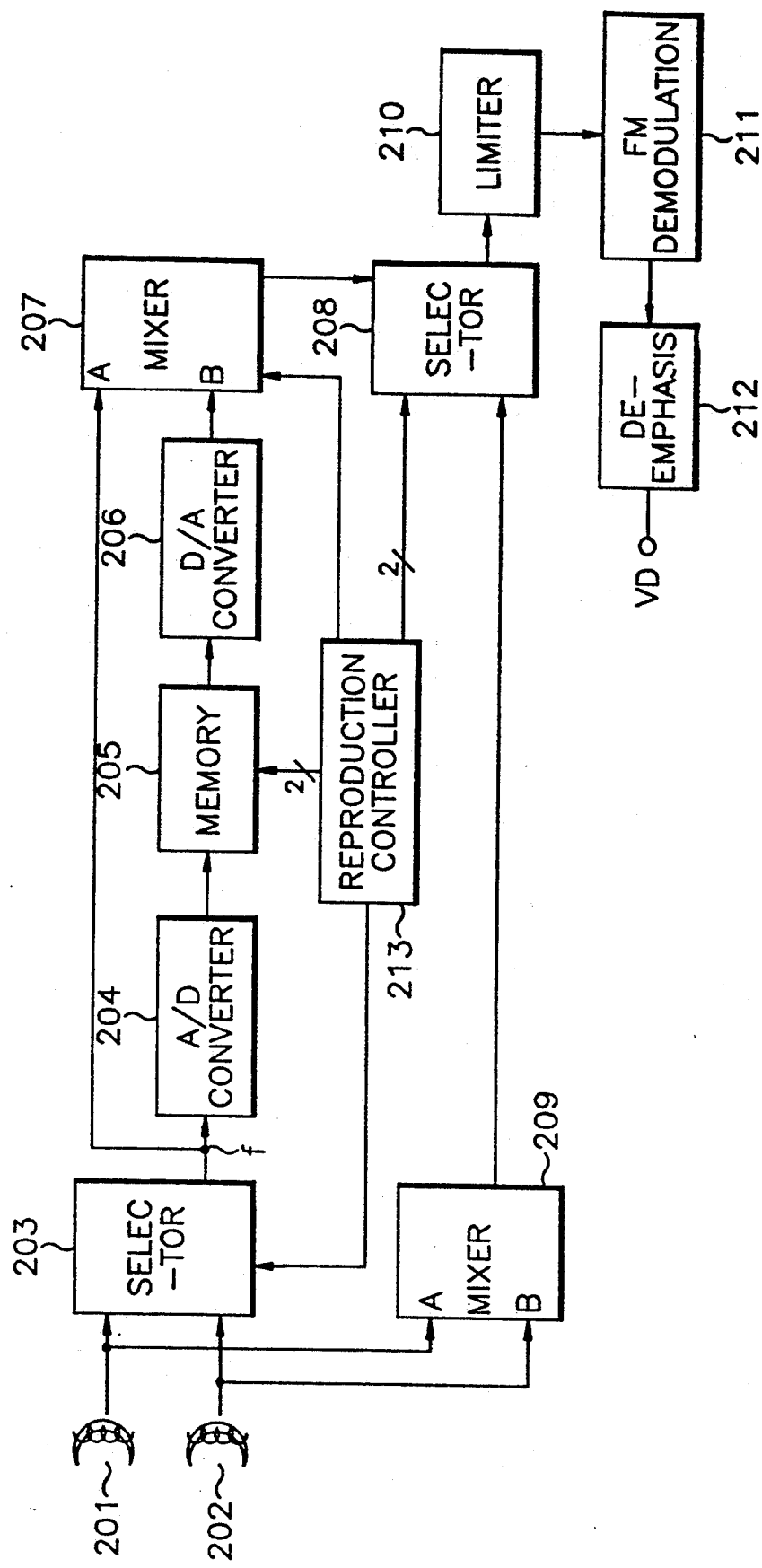
FIG. 2 is a schematic block diagram of a video signal reproducing circuit according to the present invention.

Referring to FIG. 2, there is shown a preferred embodiment of a video signal reproducing circuit according to the present invention. A reproduction controller 213 exercises various controls to reproduce those picture signals recorded on the tape and produces particularly a second memory control signal, a second mixing control signal, a second selection control and a third selection control signal. A first reproduction head 20 and a second reproduction head 202 reproduce the picture signals recorded on the video tape to electrical signals. A third mixing circuit 209 mixes those two video taped signals reproduced by the first and second reproduction heads 201, 202 to thereby produce a complete one-frame video signal. A second selection circuit 203 receives the recorded signals of two channels reproduced by the first and second reproduction heads 201, 202 and outputs those signals selectively by the second selection control signal applied from the reproduction controller 213. A second A/D conversion circuit 204 converts the output of the second selection circuit 203 into a digital signal. A second memory 205 receives the second memory control signal generated in the reproduction controller 213 and stores the output of the second A/D conversion circuit 204 so as to read therefrom and record thereon. A second D/A conversion circuit 206 again converts the output of the second memory 205 into an analog signal. A second mixing circuit 207 selectively provides either the output of the second D/A conversion circuit 206 or the output of the second selection circuit 203 according to the second mixing control signal. A third selection circuit 208 selectively provides either the output of the second mixing circuit 207 or the output of the third mixing circuit 209 according to said third selection control signal. A limiting circuit 210 has the output of the third selection circuit 208 limited only to a given band level. An FM demodulation circuit 211 demodulates the output of the limiting circuit 210 to obtain therefrom the original pre-modulation signal. A de-emphasis circuit 212 provides in its output a de-emphasized original signal from the outputs of said FM demodulation circuit 211 to thereby restore to the original signal without emphasis.

Figure 3:
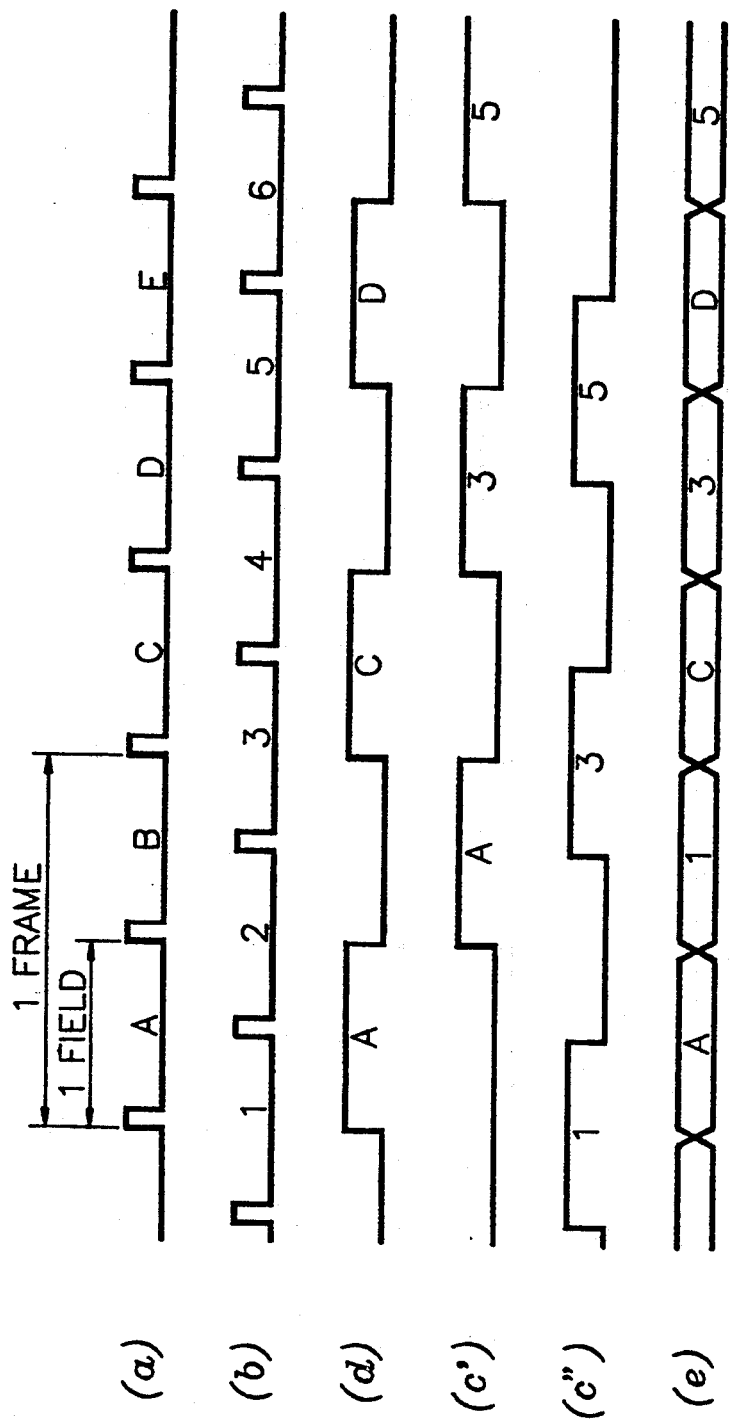
FIG. 3 is a timing diagram in the circuit of FIG. 1.

FIG. 3 shows a timing diagram in operation of the embodiment circuit of FIG. 1, wherein a waveform (a) shows an output of the first vertical synchronization detection circuit 104, (b) an output of the second vertical synchronization detection circuit 105, (c') a first memory control signal provided from the recording controller 106, when the first memory means 102 is driven into a read condition, (c'') the first memory control signal when said first memory circuit 102 is controlled in a write condition, (d) a signal supplied from said recording controller 106, that is, the first mixing control signal to control the selection condition of the first mixing circuit, and (e) an output waveform of said first memory circuit 102.

Figure 4:
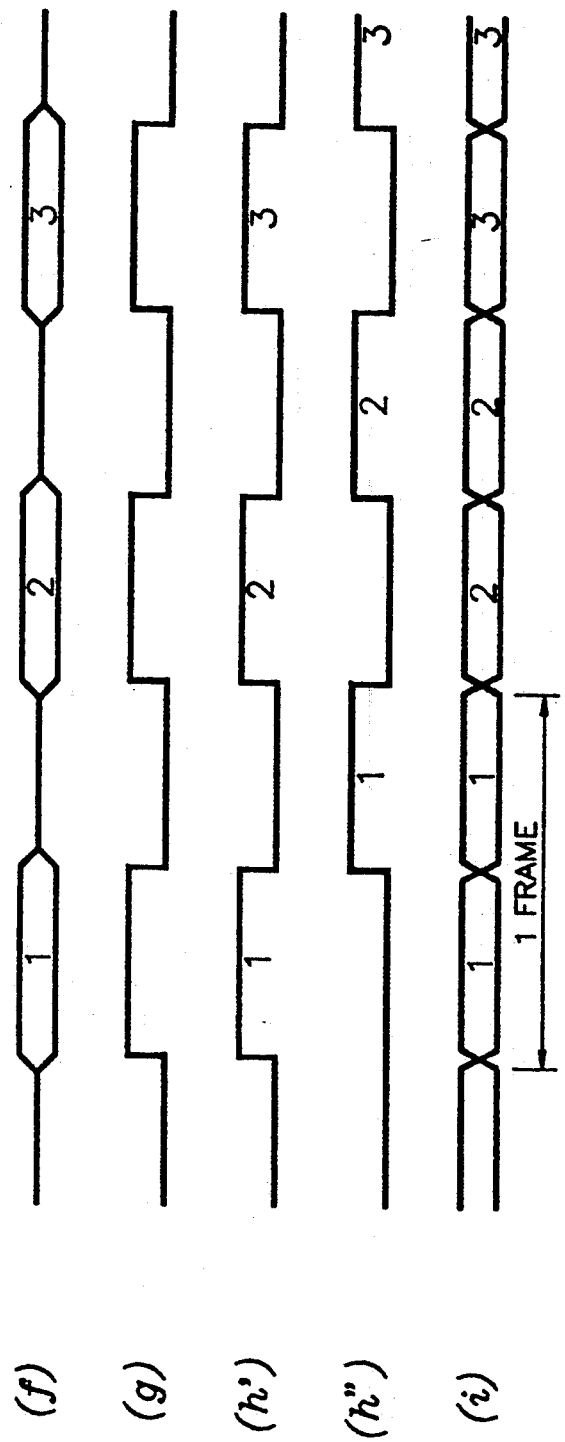
FIG. 4 is a timing diagram in the circuit of FIG. 2.

FIG. 4 shows a timing diagram in operation of the embodiment circuit of FIG. 2, wherein a waveform (f) shows an output waveform of the second selection circuit 203, (g) a second mixing control signal generated in the reproduction controller 213 to control the signal selection condition of second mixing circuit 207, (h') a second memory control signal generated in the reproduction controller 213 when the second memory means 205 is driven to a write condition, (h'') a second memory control signal when said second memory control signal drives said second memory means 205 into a read condition, and (i) an output signal of the second mixing circuit 207.

Generally, one-frame of a picture signal is adapted to be recorded on a video tape by being divided into two fields in an interlacing manner, when a so-called NTSC system of interlacing scanning is adopted. So, if the picture signal is able to be recorded only in one field instead of two fields, the remaining one field space of the video tape could be put to other use, though it may lead to deterioration of the picture resolution when reproduced. The present invention, therefore, aims at recording 2-channel of broadcast signals on one video tape at the same time by recording the picture of other channel on the remaining space. Hence, in case where higher resolution of pictures is required, a conventional known recording/playback system may be used with the option of concurrently recording the two-channel pictures with using the embodiment circuits as described heretofore. Thus, the present invention may be used only when desired.

FIG. 1 and FIG. 2 give a concrete form to the principle. FIG. 1 is a circuit which records 2-channel pictures. FIG. 2 is a circuit which reproduces a scene recorded on video tape by the same system as FIG. 1.

When a first picture signal and a second picture signal are applied to the two different video signal input terminals VD1, VD2 in FIG. 1, the first and second vertical synchronization detection circuits 104, 105 detect vertical synchronization signals like (a) and (b) of FIG. 3 to obtain control signals necessary to mix the two picture signals. The recording controller 106 receives the detected vertical synchronization signals to therefrom produce a first memory control signal, a first mixing control signal and a first selection control signal. The first memory control signals C' and C" are signals used when synchronization is to be set in between the first picture signal and the second picture signal. These signals control the read/write operation in the first memory 102. When C" value is high, said first memory circuit is controlled in a write condition. When C' value is low, said first memory circuit is controlled in a read condition.

The first mixing control signal is that used for making a single signal by mixing the first and second picture signals together. It is applied to the selection signal input terminal S of the first mixing circuit 107. When its value is high, the first mixing circuit 107 selects to provide the first picture signal. When its value is low, the first mixing circuit 107 selects to provide the second picture signal. The first selection control signal is a signal used when the optional function of controlling it so as to select only one signal from among the mixed signal of the first and second picture signals, and the first and second picture signals is realized. It has three conditions of values, namely, a mixed condition selection signal, a first picture signal selection signal and a second picture signal selection signal.

If the first and second picture signals are inputted through the first and second video signal input terminals VD1 and VD2 when the control signals described above are generated from the recording controller 106, said second picture signal is converted into a digital signal in the first A/D conversion circuit 101 and then it is stored in the first memory circuit 102 by the first memory control signal in order to synchronize the phases of the two signals with each other. At this time, the recording controller 106 provides the first memory control signal of logic high signal during the period 1 from the first vertical synchronization signal to the next vertical synchronization signal as in the waveform (b) of FIG. 3, and provides the first mixing control signal of logic high signal during the period A from the first vertical synchronization signal to the next vertical synchronization signal from among the vertical synchronization signals as in (a) of FIG. 3. Then, the first mixing circuit 107 selects the first picture signal during the period A of FIG. 3, (a) and the first memory circuit 102 stores the second picture signal during the period 1 of FIG. 3, (b). The recording controller 106 changes the first memory control signal into a logic low signal when it receives a vertical synchronization signal at the end of the period of FIG. 3, (b) from the second vertical synchronization detection circuit 105. Thereafter, if it receives a synchronization signal at the end of the period A of FIG. 3, (a) from the first vertical synchronization detection circuit 104, it drives the first memory control signal in a read condition. By doing so, it reads the said signal stored during the period 1 of FIG. 3, (b) and restores it to an analog signal in the first D/A conversion circuit 103 and then supplies the signal to the input terminal B of the first mixing circuit 107. Moreover, the recording controller 106 controls to select the signal of the input terminal B of the first mixing circuit 107 by changing logic state of the first selection control signal.

When operations are carried out in such a manner, the first and second picture signals can be mixed with each other in half frames like FIG. 3, (e). And, when the above one-frame operation is repeated, the first and second picture signals can all be mixed in half-frame frequency.

The signals mixed in the mixing circuit 107 are applied to the first selection circuit 108. After they are selected by the first selection control signal and a high-band component is emphasized in the pre-emphasis circuit 109, its frequency is modulated in the FM circuit 110 and amplified through the amplifier 111 and then applied to the recording head 112 to be eventually recorded on the video tape.

The reproduction of those signals recorded in such a manner is conducted by the system of FIG. 2. To begin with, the first reproduction head 201 and the second reproduction head 202 reproduce those signals recorded on video tape by dividing them into half frame. At this time, the reproduction controller 213 generates various control signals necessary for reproduction. In other words, it provides a second selection control signal to control the selection condition of second selection circuit 203, a second memory control signal (h) to control the read/write timing of second memory circuit 205, a second mixing control signal (g) to control the mixing condition of second mixing circuit 207 and a third selection control signal to control the third selection circuit 208.

The second selection circuit 203 receives the second selection control signal and selects the signal of the first reproduction head 201 or the second reproduction head 202 and outputs it. Assuming that the first reproduction head 201 reproduces the first picture signal and the second reproduction head 202 reproduces the second picture signal at this time, said second selection circuit 203 will select between the first and second picture signals. The output of the second selection circuit 203 is inputted to the input terminal A of second mixing circuit 207 and, at the same time, converted into a digital signal and then inputted to the second memory circuit 205 by the second memory control signal. The second memory circuit 205 writes an input signal by the second memory control signal and then reads and outputs it by delaying it to the extent of half frame. The signal delayed to the extent of half frame is converted again into an analog signal by the second D/A conversion circuit 206 and inputted to the input terminal (B) of the second mixing circuit 207. The reason that the signal of the second selection circuit 203 is delayed by using said second memory circuit 205 at this time, is that the signals outputted from said second selection circuit 203 are not complete signals like FIG. 4, (f), but half-frame signals, and these signals must be made into complete signals like FIG. 4, (i).

The second mixing circuit 207 selects the signal of input terminal A for a start during the half-frame period by the second mixing control signal and selects the signal of input terminal B which delayed the signal of the input terminal A to the extent of half frame through the second D/A conversion circuit 206 during the remaining half-frame period and repeats two times the data contained in one section of the FIG. 4, to thereby make a complete one-frame signal like FIG. 4, (i) as an output. The third mixing circuit 209 mixes the signals of the first and second reproduction heads 201, 202 in consecutive order and provides them when those signals recorded on the video tape are not signals from two channels but signals from one channel and the same picture signals as the existing signals are obtained. The output of the second mixing circuit 207 and the output of the third mixing circuit 209 are applied to the third selection circuit 208 and either one of the two is selected by the third selection control signal. At this time, the selection is optional. The output of the third selection circuit 208 is outputted through the output terminal Vo as the original video signal after noise is suppressed by reducing again the high band augmented in the pre-emphasis circuit 109 when recorded in the deemphasis circuit 212 after its amplitude is restricted in the limiting circuit 210 and its frequency is demodulated in the FM circuit 211.

As heretofore described, the present invention has the advantage of making it possible for the televiewers to choose a wide variety of information by recording 2-channel picture signals at the same time on one video tape and selecting either one of the two at their option.

While the foregoing provides a full and complete disclosure of the preferred embodiments of the present invention, various modifications, alternate constructions and equivalents thereof may be employed without departing from the true spirit and scope of the invention. Therefore, the above description and illustration should not be construed as limiting the scope of the invention, which is defined by the appended claims.

We claim:

1. A circuit for simultaneously recording at least two picture signals on a video tape in a video tape recorder, said circuit comprising:
    a first video signal input terminal and a second video signal input terminal for receiving a first input signal and a second input signal, respectively;
    first vertical synchronization detection means for detecting a first vertical synchronization signal from said first input signal received by said first video signal input terminal;
    second vertical synchronization detection means for detecting a second vertical synchronization signal from said second input signal received by said second video signal input terminal;
    analog/digital conversion means for converting said second input signal into a digital signal;
    recording controller means for receiving said first vertical synchronization signal and said second vertical synchronization signal, and for producing a first memory control signal, a first mixing control signal and a first selection control signal;
    memory means for receiving and storing said digital signal converted by said analog/digital conversion means under control of the first memory control signal;
    digital/analog conversion means for receiving and converting said digital signal read out of said memory means into a corresponding analog signal;
    mixing means for receiving and providing one of said analog signal from said digital-analog conversion means and said first input signal from said first video signal input terminal under control of said first mixing control signal to thereby mix said analog signal and said first input signal in half frame units to generate a mixed signal;
    selection means for selectively providing one of said mixed signal form said mixing means, said first input signal, and said second input signal according to said first selection control signal as a selected signal; and
    means for recording said selected signal on said video tape.

2. The circuit as set forth in claim 1, further comprising pre-emphasis means connected to receive the selected signal, for augmenting a high-band portion of said selected signal before said selected signal is recorded by said recording means.

3. A circuit for reproducing one of two video signals recorded on a single video tape, said circuit comprising:
    reproduction controller means for providing a memory control signal, a mixing control signal, a first selection control signal and a second selection control signal;
    first mixing means for mixing together video signals received from reproducing heads to generate a first complete one-frame video signal;
    selection means for receiving and providing one of said video signals generated by said reproducing heads as a first selected signal in dependence upon said first selection control signal;
    analog/digital conversion means for receiving and converting said first selected signal from said selection means into a corresponding digital signal;
    memory means for storing said digital signal in response to said memory control signal;
    digital/analog conversion means for converting said digital signal stored by said memory means into a corresponding analog signal;
    second mixing means for mixing said analog signal with said first selected signal according to said mixing control signal so as to generate a second complete one-frame video signal; and
    second selection means for selectively providing one of said first complete one-frame video signal and said second complete one-frame video signal to a video output terminal according to said second selection control signal.

4. The circuit as set forth in claim 3, further comprising limiting means for limiting of said signal provided by said second selection means to a given band level.

5. A circuit for simultaneously recording at least two picture signals on a video tape in a video tape recorder, said circuit comprising:
    first vertical synchronization detection means for detecting first vertical synchronization signals form first input signals;
    second vertical synchronization detection means for detecting second vertical synchronization signals from second input signals;
    analog/digital conversion means for converting said second input signals into digital signals;
    memory means for receiving and storing said digital signals in response to said second vertical synchronization signals;
    digital/analog conversion means for receiving and converting said digital signals read out of said memory means in response to said first vertical synchronization signals into corresponding stored analog signals;
    multiplexer means for alternately providing one of said stored analog signals and said first input signals in response to said first vertical synchronization signals to thereby mix said stored analog signals and said first input signals in half frame units to generate mixed signals; and
    means for recording said mixed signals on said video tape.

6. A circuit as claimed in claim 5, further comprising selection means for selectively providing one of said mixed signals, said first input signals, and said second input signals as selected signals to be recorded on said video tape.

7. A circuit as claimed in claim 6, further comprising pre-emphasis means for generating output video signals by augmenting said selected signals in a high frequency portion.

8. A circuit for reproducing one of two picture signals recorded on a single video tape in a video tape recorder having reproducing heads, said circuit comprising:

first mixing means for mixing together video signals received from said reproducing heads to generate first complete frame video signals if a single picture signal is recorded on said video tape;

selection means for receiving and providing individual video signals generated by said reproducing heads if at least two picture signals are recorded on said video tape;

analog/digital conversion means for receiving and converting said individual video signals provided by said selection means into corresponding digital signals;

memory means for storing said digital signals;

digital/analog conversion means for converting said digital signals stored by said memory means into corresponding stored analog signals;

second mixing means for selectively providing one of said stored analog signals and said individual video signals as second complete frame video signals; and second selection means for selectively providing one of said first complete frame video signals and said second complete frame video signals as selected signals.

9. A circuit as claimed in claim 8, wherein said memory means delays said digital signals for one-half frame period before being provided to said digital/analog conversion means.

10. A circuit as claimed in claim 8, further comprising limiting means for limiting of said selected signals to a set frequency band.

11. A circuit capable of reproducing selected video signals of a first source form a video tape when a plurality of video signals of plurality of sources are recorded on said video tape, said circuit comprising:

reproducing head means for regenerating recorded video signals from said video tape;

first mixing means for mixing together said recorded video signals received from said reproducing head means to generate first full frame video signals when said recorded video signals are from a single source;

first selection means for providing only said selected video signals of said first source when said plurality of said video signals of said plurality of sources are recorded on said video tape;

analog/digital conversion means for receiving and converting said selected video signals provided by said first selection means into corresponding converted digital signals;

memory means for storing said converted digital signals for one field period and reading out said converted digital signals as delayed digital signals;

digital/analog conversion means for converting said delayed digital signals stored by said memory means into corresponding delayed video signals;

second mixing means for mixing said selected video signals provided by said first selection means with said delayed video signals to generate second full frame video signals by providing alternatingly fields of said selected video signals and fields of said delayed video signals;

second selection means for selectively providing one of said first full frame video signals and said second full frame video signals as an output signal.

* * * * *

UNITED STATES PATENT AND TRADEMARK OFFICE
CERTIFICATE OF CORRECTION

PATENT NO. : 5,272,574
DATED : December 21, 1993
INVENTOR(S) : Pan-Gi Park and Hyeong-Gu Byeon It is certified that error appears in the above-indentified patent and that said Letters Patent is hereby corrected as shown below:

Column 1, Line 19, Delete "one";

Line 57, Delete "means";

Column 3, Line 46, Change "20" to --201--.

IN THE CLAIMS

Column 10, Line 5, Change "form" to --from--.

Signed and Sealed this

Twentieth Day of September, 1994

Attest:

BRUCE LEHMAN

*Attesting Officer*          *Commissioner of Patents and Trademarks*